(12) United States Patent
Puntke

(10) Patent No.: US 6,334,653 B1
(45) Date of Patent: Jan. 1, 2002

(54) CONVEYOR DEVICE AND METHOD OF REMOVING MATERIAL USING THE CONVEYOR DEVICE

(75) Inventor: Wolfgang Puntke, Frankfurt am Main (DE)

(73) Assignee: Wayss & Freytag AB, Frankfurt am Main (DE)

(*) Notice: Subject to any disclaimer, the term of this patent is extended or adjusted under 35 U.S.C. 154(b) by 0 days.

(21) Appl. No.: 09/355,274
(22) PCT Filed: Nov. 11, 1998
(86) PCT No.: PCT/DE98/03289
§ 371 Date: Sep. 8, 1999
§ 102(e) Date: Sep. 8, 1999
(87) PCT Pub. No.: WO99/28671
PCT Pub. Date: Jun. 10, 1999

(30) Foreign Application Priority Data

Nov. 28, 1997 (DE) ............................. 197 52 718

(51) Int. Cl.[7] .................................. E21D 9/12
(52) U.S. Cl. ................ 299/1.9; 405/144; 222/450; 406/110
(58) Field of Search ............... 299/1.3, 1.9, 18, 299/33, 56, 58; 405/141, 144; 222/450; 406/85, 93, 109, 110, 148, 192

(56) References Cited

U.S. PATENT DOCUMENTS 4,116,487 A * 9/1978 Yamazaki et al. .......... 299/1.9
4,846,606 A * 7/1989 Fukada .................... 405/144
5,203,614 A * 4/1993 Robbins et al. ............ 299/33

FOREIGN PATENT DOCUMENTS

| DE | 33 17 166 | 11/1984 |
| DE | 34 28 431 | 2/1986 |
| DE | 36 22 267 | 1/1988 |
| DE | 36 27 270 | 2/1988 |
| DE | 42 06 831 | 7/1993 |
| FR | 2 679 959 | 2/1993 |
| GB | 1 570 329 | 6/1980 |
| JP | 1-192997 | 8/1989 |
| JP | 4-198592 | 7/1992 |
| JP | 10-252390 | 9/1998 |

OTHER PUBLICATIONS

Herrenknecht Tunnelvortriebstechnik, "EPB–Maschinen–Tunnelvortrieb In Bindigen Boden Und Mehr" received at German Patent Office Jul. 4, 1995.

* cited by examiner

Primary Examiner—David Bagnell
Assistant Examiner—Sunil Singh
(74) Attorney, Agent, or Firm—Young & Thompson

(57) ABSTRACT

To move debris (6), the porosity of which presents certain properties, from a space subjected to the pressure of a compressible substance, such as air, where the pressure is high (pressure chamber, (1)) to a space (3) where the pressure is lower, the invention provides for an extraction chamber (2) to be positioned between the pressure chamber (1) and the space (3), which extraction chamber can be closed in relation to both spaces by means of slides (4 and 5). When the slide (4) is opened and the slide (5) is closed the extraction chamber (2) is filed with debris using the positive pressure in the chamber (1). After the slide (4) is closed and the slide (5) is opened the debris (7) contained in the extraction chamber (2) is evacuated from the chamber (2) into the space (3) by the pore pressure present in the debris.

12 Claims, 3 Drawing Sheets

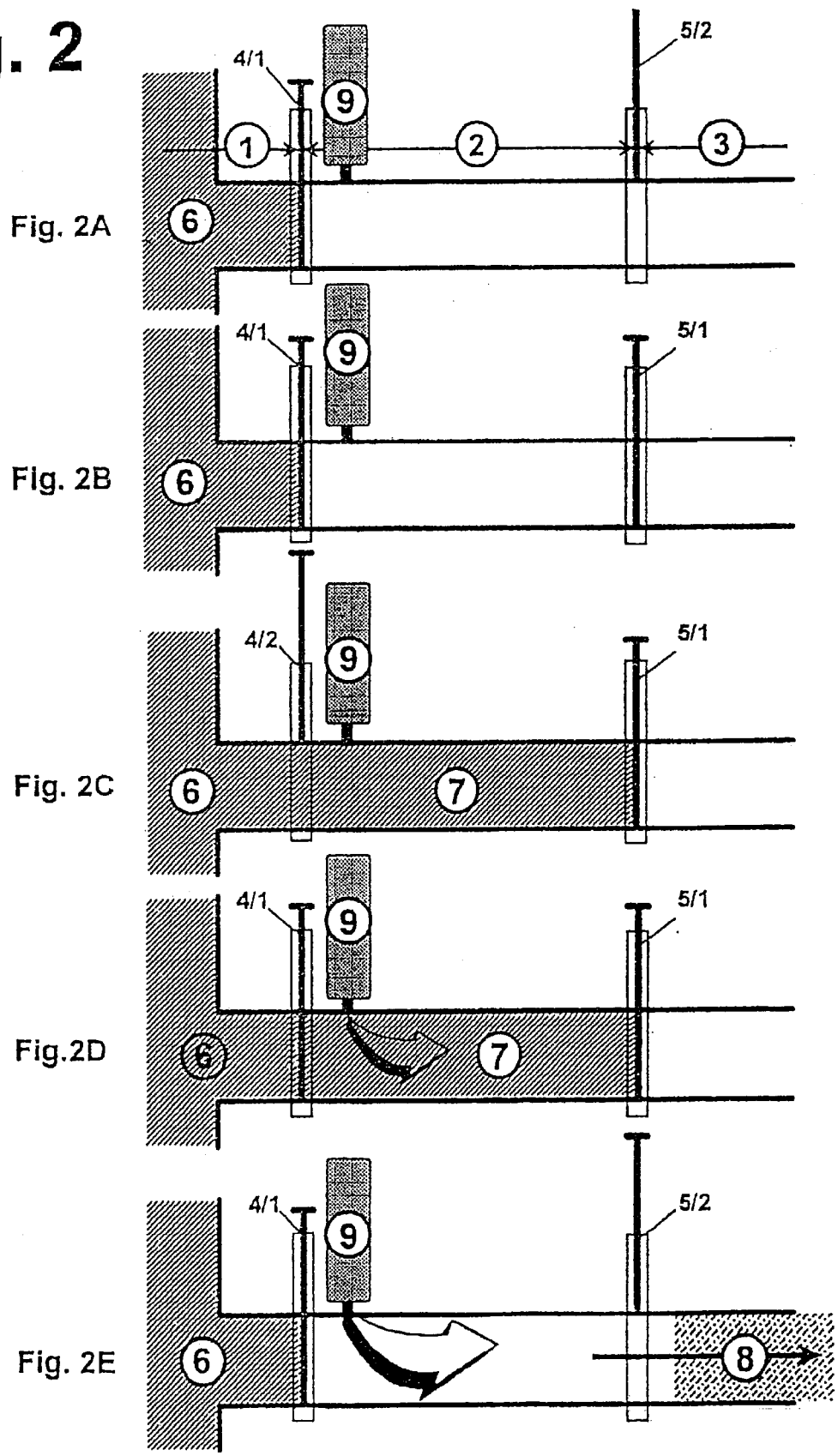

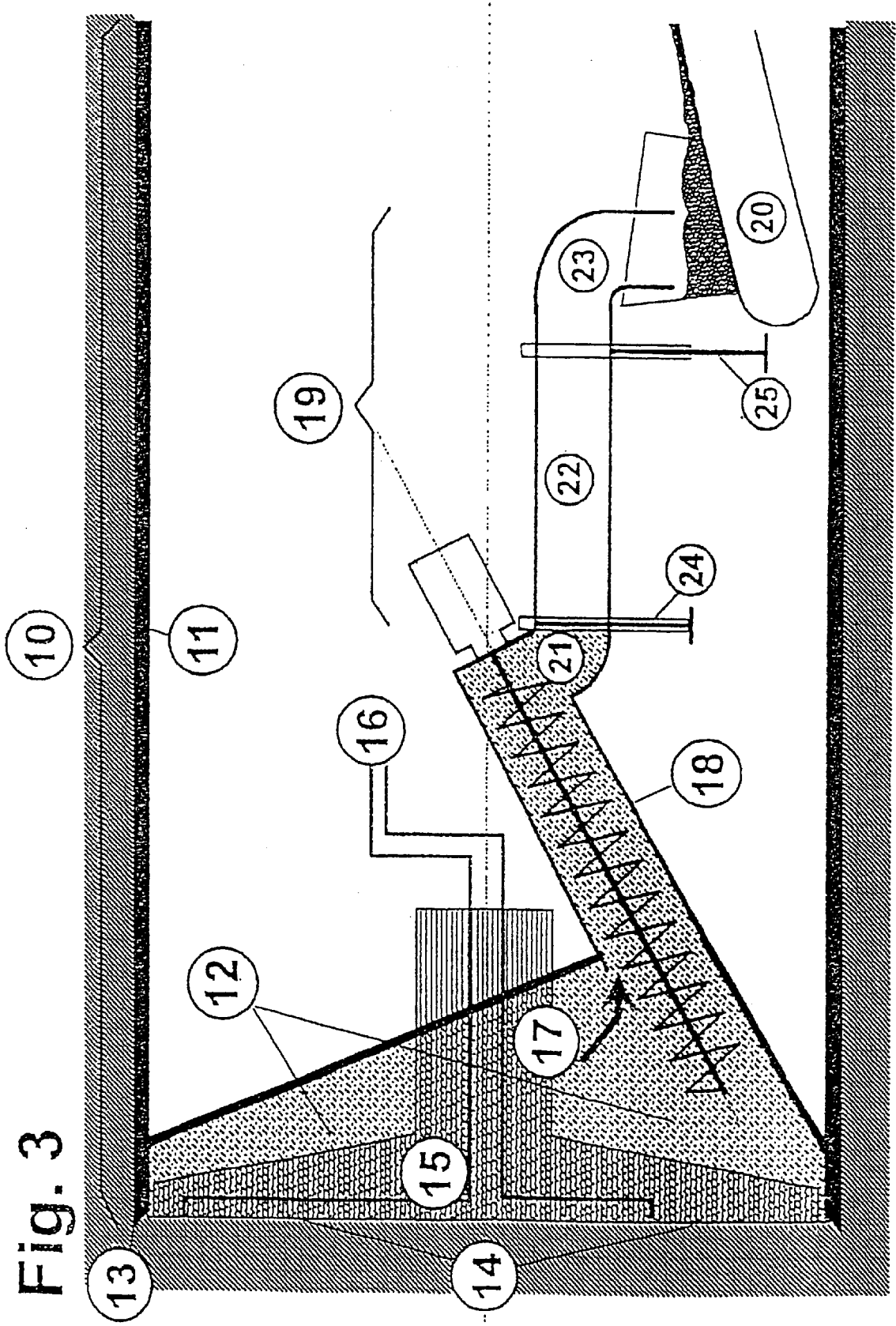

CONVEYOR DEVICE AND METHOD OF REMOVING MATERIAL USING THE CONVEYOR DEVICE

Figure 1:
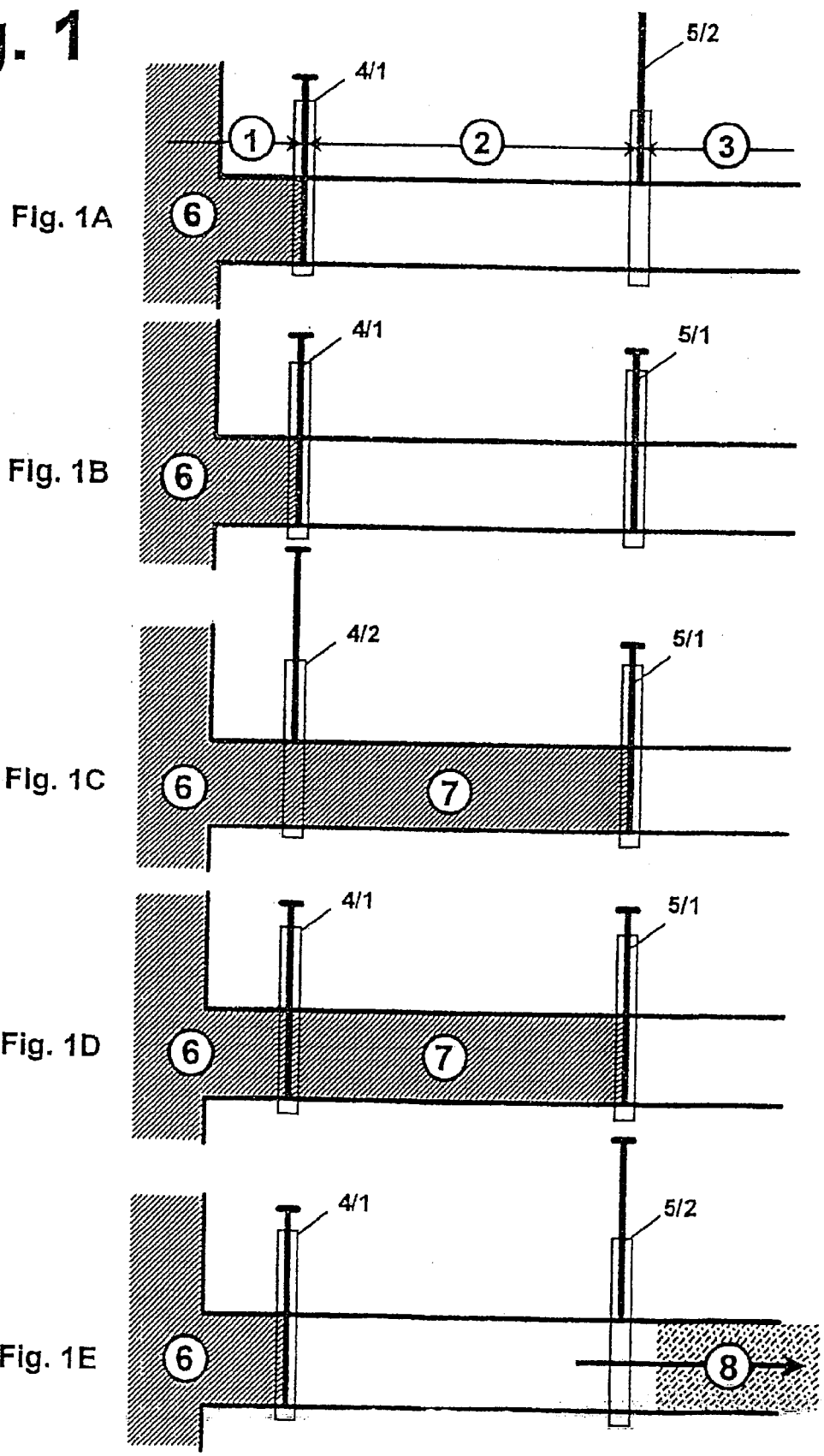

The invention relates to a method for carrying out material from a pressure chamber as well as to a conveyor device for carrying out said method.

From the area of tunnel construction—for example from hydro shields—it is known to carry out muck (excavation), which has been stripped in-situ in the stripping chamber, out of the stripping chamber through pipe conduits with the help of the liquid supporting the working face and to haul it away by pumps. This method suffers from the drawback that along with the muck huge amounts of liquid have to be transported and separated thereafter from the muck. The supporting liquid is recuperated. This calls for large separation plants. The soil extracted by the separation process still contains a high content of support liquid and is unfit for short-term soil-mechanical processing. This soil causes further costs for its shipping away and dumping. The disposal of the stripped muck and the support liquid comprised therein is thus very costly with shields working with supporting the working face by a liquid.

With EPB-shields (EPB=Earth Pressure Balanced) stripped soil, which is adequately impermeable by nature and conditioned by suitable agents, such as foams, is used for supporting the working face. So far, this soil has been transported away from the stripping chamber by screw conveyors.

The compacted column of soil in the screw conveyor during the conveying process acts as a seal against the pressure in the stripping chamber and as a lock to the unpressurized rear shield space. The larger the permeability of the soil the larger has to be the length of the sealing column of soil and correspondingly the screw of the conveyor. The effectiveness of the stopper formed by the soil as a pressure seal for the chamber has its limits at a soil with a k-value greater than $10^{-5}$ m/s and at a support pressure above about 2 bar.

Soils with too great a permeability can no longer withstand the pore pressure in the soil stopper, thus making necessary a lock for material arranged at the end of the screw conveyor. Such locks for material are in a wider sense pumps, such as piston pumps, hose pumps and centrifugal pumps, as well as drawer-like and rotating lift-locks. They comprise rotating and moving parts which are subject to high wear. They normally require a system-related conditioning of the muck to be carried out which contradicts the object of achieving an extract as dry as possible. Their extraction capacity in relation to the hauling capacity of the shield is small. To increase the extraction capacity large constructions are necessary which can be accommodated in the shield space only at large tunnel cross-sections. This means that the yield capacity of the shield can not fully be utilized. Therefore, such excavation equipment considerably reduces the economy of a heading machine.

From DE-A-36 272 70 an EPB-shield is known where the loosened soil is transported out of the stripping chamber with a screw conveyor. The screw of the conveyor presses the stripped soil out of the pressure chamber towards a closable sliding valve outlet in the inner space of the shield, and from said outlet of the sliding valve the soil is carried away on a conveyor belt arranged below said outlet in the area of atmospheric pressure. As explained above, such a conveyor plant is unable to hold back the higher pressure in the pressure chamber if the soil is permeable. With permeable soils the sliding valve has to be closed and the excavation of soil has to be stopped.

The invention aims at developing a method and a device for carrying out material from a pressure chamber which also allow the excavation of soils with a permeability $k>10^{-5}$ m/s in a simple, wear-proof, space-saving and reliable manner.

According to the method the excavation of muck from a pressure chamber is achieved by using, in a surprisingly simple manner, the energy stored in a compressed medium—such as a gas, a gas mixture, foam or foamed suspension—in the pores in the muck at the moment of depressurisation. This method is preferably developed for tunnel construction. The same method could be used in analogue manner in other industries, where muck-like substances are to be carried out of pressurized containers, for example in primary matter industries, the chemical industry, garbage dressing and garbage disposal.

The method according to the invention is principally independent of a conveyor device, such as a pump or a screw conveyor, connected in front of the conveyor chamber. The conveyor chamber is a simple cell which only serves to form a closable space, and it comprises no rotating parts or mechanical drives. Thus, the conveyor chamber is very insensitive under operation. It requires little space and may accommodated in the shield space in a simple manner.

The times needed for charging and discharging the conveyor chamber are short, thus enabling a fast cycle sequence and a large throughput. Thus, the conveyor device according to the invention is most adapted to satisfy the excavation demands of a shield heading machine.

The material to be carried out may be conditioned with very little water, thus yielding favourable conditions for an economic excavation and simple re-storage.

In tunnel construction often varying layers of different kinds of soil have to be excavated, which can not homogenously be mixed or conditioned. When inhomogenous mixtures of pore-poor, largely impervious soils and highly gas and water pervious soils have to be excavated under holding the pressure, it may occur that the change of the kinds of soil during excavation results in a situation where the muck to be excavated exhibits such a small porosity that the expansion energy stored in the muck is not sufficient to bring about a complete and sufficiently fast extraction. This tendency is enhanced by a moderate pressure gradient.

In order to enable a reliable use of the method suggested also under these conditions an accumulator for pressurized gas is alternatively arranged at the inlet area of the conveyor chamber which, if necessary, provides additionally required expansion energy and which may become connected if inhomogenious soil mixtures of different cohesion or soils with a small expansion energy have to be excavated.

The invention will be explained with reference to the FIGS. 1 to 3.

FIG. 1A–E show a schematic illustration of the different phases of a working cycle of the method according to the invention, FIGS. 2A–E show a schematic illustration of the method according to the invention according to FIGS. 1A–E supplemented with an accumulator for pressurized gas, FIG. 3 shows an example of an application of a conveyor chamber according to the invention in an EPB-shield.

FIGS. 1A–E illustrate the mode of operation of the conveyor chamber 2 according to the invention. The conveyor chamber is arranged between a pressure chamber 1, in which high pressure prevails, and a carry-out element 3 in the area of lower pressure. The conveyor chamber is closable against the pressure chamber 1 by a sliding valve 4 and against the low-pressure area 3 by the sliding valve 5.

During phase FIG. 1A the pressurized material 6, which is to be carried out of the pressure chamber 1, extends to the sliding valve 4, which is in its closed position 4/1. The sliding valve 5 is still in its opened position 5/2 following the preceded discharge of the conveyor chamber. In phase FIG. 1B the sliding valve 5 is moved to its closed position 5/1. Low pressure prevails in the empty conveyor chamber 2. Thereafter, in phase FIG. 1C the sliding valve 4 is moved to its open position 4/2. The over-pressure in the pressure space 1 presses the muck (excavation) 6 into the empty conveyor chamber 2. In phase FIG. 1D the sliding valve 4 is moved to its closed position 4/1. In the conveyor chamber 2 there is a separated muck volume 7 loaded with over-pressure in its pores. In phase FIG. 1E the sliding valve 5 is abruptly brought to its open position 5/2.

The pore over-pressure in the muck 7, which pressure is larger than the pressure in the low-pressure space 3, presses the muck volume 7 out of the conveyor chamber 2 and the depressurized muck 8 exits in the low-pressure area. Thus, the state of phase FIG. 1A has been regained, and a new excavation cycle may start.

In FIG. 2 the conveyor chamber 2 is provided with an accumulator for pressurized gas 9 in its inlet area. The operation sequence of the phases FIG. 2A to 2C correspond to those of FIGS. 1A to 1C. In phase FIG. 2D the sliding valve 4 is moved to its closed position 4/1. In the conveyor chamber 2 there is a separated muck volume 7 which is subjected to pore over-pressure. The accumulator for pressurized gas 9 is loaded with the pressure which is higher than the pore over-pressure. By opening the connection valve between the accumulator 9 and the conveyor chamber 2 the pore over-pressure in the closed conveyor chamber 2 will increase. In phase FIG. 2E the sliding valve 5 is abruptly brought into its open-position 5/2. Simultaneously with or immediately after the opening of the sliding valve 5 the accumulator for pressurized gas 9 ejects a further pulse of pressurized gas into the inlet area of the conveyor chamber 2. The expansion pressure of the gas pulse and the increased pore over-pressure in the muck 7 vis-a-vis the low-pressure space 3 press the muck volume 7 out of the conveyor chamber 2, and the depressurized muck 8 exits into the area of low pressure. Thus, the situation of phase FIG. 2A has been regained, and a new excavation cycle may start.

FIG. 3 illustrates an example for an application of the conveyor device according to the invention in an EPB-shield heading machine 10. The pressure space 12 arranged at the head of the shield 11 is closed at its rear end by the funnel-shaped rear wall of the stripping chamber, which exerts pressure against the working face 14 with its cutting edge 13 and thus seals the pressure space at the front side. A cutting wheel 15 strips the soil at the working face. The soil supports the working face by means of the driving of the shield and the pressure of the foam which is pressed through conduit 16 against the working face 14 and into the stripping chamber 12 and which is mixed into the stripped muck in the stripping chamber by the rotational movement of the cutting wheel.

The muck 17 is pressed into the screw conveyor 18 which is suitably installed between the stripping chamber 12 and the conveyor device 19 in order to achieve a continuous supply of muck to the conveyor device 19 according to the invention. The conveyor device 19 discharges on a conveyor belt 20. The conveyor device consists of an inlet portion 21, which substantially is subjected to the pressure in chamber 12, the conveyor chamber 22 and an outlet element 23. The sliding valve 24 is arranged between the inlet portion 21 and the conveyor chamber, and the sliding valve 25 is arranged between the conveyor chamber and the outlet element 23. To extract the muck from the pressure chamber 12 the same steps as described with regard to FIG. 1 or 2 take place in the conveyor device 19.

What is claimed is:

1. Method for removing material from a pressure chamber, in which pressure chamber (1, 12) the material is mixed with a compressed gaseous medium and from which the pressurized material with said compressed gaseous medium moves out through an open inlet valve (4,24) by the force of the pressure in the pressure chamber which pressure is larger than a lower pressure prevailing in a space outside the pressure chamber, wherein the material with said compressible gaseous medium is pressed through said open inlet valve (4,24) into a conveyor chamber (2,22) which is limited by said inlet valve (4,24) and by a closed outlet valve (5,25), closing the inlet valve (4,24) and abruptly opening of the outlet valve (5,25) causing sudden expansion of said compressed gaseous medium and expelling material from said conveyor chamber into said space.

2. Method according to claim 1, wherein said pressure chamber is a stripping chamber (12) of an earth-pressure-balanced shield heading machine for tunnel construction and said material is muck excavated by a cutting wheel (14) of said heading machine.

3. Method according to claim 1, wherein said material with said compressible gaseous medium is pressed via a conveyor device (18), which is connected with an inlet side to said pressure chamber (12) and with an outlet side to said inlet valve (4,24) of said conveyor chamber (22).

4. Method according to claim 3, wherein said conveyor device is a screw conveyor (18).

5. Method according to claim 1, and increasing the ejection energy in the conveyor chamber (2,22) by additional gas introduced into the closed conveyor chamber filled with material (7).

6. Conveyor device for carrying out the method according to claim 1, which conveyor device (19) is adapted to press out material from a pressure chamber (1,12) through said open inlet valve (4,24) by means of the pressure in the pressure chamber, which pressure is larger than a lower pressure prevailing in said space outside the pressure chamber, wherein the path of extraction between the pressure chamber (1,12) and said space (3,23) is provided by an empty conveyor chamber (2,22) with smooth walls, which conveyor chamber is limited by said inlet valve (4,24) against the pressure chamber (1,21) and by said outlet valve (5,25) against said space, said outlet valve being adapted to be quickly opened toward said space (3,23), and said valves (4,5;24,25) being so controlled that one valve can be opened only when the other valve is closed.

7. Conveyor device according to claim 6, wherein said pressure chamber is a stripping chamber (12) of an earth-pressure-balanced shield heading machine for tunnel construction and said material is muck excavated by a cutting wheel (14) of said heading machine.

8. Conveyor device according to claim 6, further comprising a conveyor device (18) connected with an inlet side to said pressure chamber (12) and with an outlet side to said inlet sliding valve (4,24) at an inlet (21) of said conveyor chamber (22).

9. Conveyor device according to claim 8, wherein said conveyor device (18) is a screw conveyor.

10. Conveyor deice according to claim 6, further comprising an accumulator (9) for pressurized gas connected to said conveyor chamber (22).

11. Conveyor device according to claim 6, wherein said valves are sliding valves.

12. Method for removing material from a pressure chamber, comprising forming in said pressure chamber a mixture of a compressed gas and solid particulate matter, introducing said mixture into a conveyor chamber having an inlet opening and an outlet opening with said outlet opening closed and said mixture passing through the open said inlet opening until said conveyor chamber is full of said mixture under the pressure of said compressed gas, closing said inlet opening, and abruptly opening said outlet opening whereby said mixture is expelled from said conveyor chamber by expansion of said compressed gas, said outlet opening of said conveyor chamber communicating with a region at a pressure lower than the pressure of said compressed gas.

\* \* \* \* \*